United States Patent [19]
Akhtar et al.

[11] Patent Number: 5,336,644
[45] Date of Patent: Aug. 9, 1994

[54] SEALING GLASS COMPOSITIONS

[75] Inventors: Masyood Akhtar; Kim C. Le, both of San Diego; Jess Pedigo, La Mesa; Charles H. Smith, Ramona, all of Calif.

[73] Assignee: Johnson Matthey Inc., Wayne, Pa.

[21] Appl. No.: 89,370

[22] Filed: Jul. 9, 1993

[51] Int. Cl.$^5$ .................... C03C 8/24; C03C 8/14; C03C 3/21
[52] U.S. Cl. .................... 501/15; 501/17; 501/46; 501/73; 501/74
[58] Field of Search ............ 501/15, 17, 46, 73, 501/74

[56] References Cited

U.S. PATENT DOCUMENTS

| | | | |
|---|---|---|---|
| 4,342,943 | 8/1982 | Weaver | 313/479 |
| 4,401,767 | 8/1983 | Dietz et al. | 501/19 |
| 4,436,785 | 3/1984 | Dietz et al. | 428/427 |
| 4,459,166 | 7/1984 | Dietz et al. | 156/89 |
| 4,537,863 | 8/1985 | Matsuura et al. | 501/17 |
| 4,636,254 | 1/1987 | Husson, Jr. et al. | 106/1.14 |
| 4,741,849 | 5/1988 | Naito et al. | 501/46 |
| 4,743,302 | 5/1988 | Dumesnil et al. | 106/1.23 |
| 4,761,224 | 8/1988 | Husson, Jr. et al. | 106/1.14 |
| 4,933,030 | 6/1990 | Dietz | 501/46 |
| 5,013,360 | 5/1991 | Finkelstein et al. | 501/17 |
| 5,013,697 | 5/1991 | Akhtar | 501/46 |
| 5,066,621 | 11/1991 | Akhtar | 501/46 |
| 5,076,876 | 12/1991 | Dietz | 501/46 |
| 5,116,786 | 5/1992 | Matsuura | 501/15 |
| 5,188,990 | 2/1993 | Dumesnil et al. | 501/17 |

*Primary Examiner*—Mark L. Bell
*Assistant Examiner*—Deborah Jones
*Attorney, Agent, or Firm*—Christie, Parker & Hale

[57] ABSTRACT

A sealing glass composition suitable for bonding ceramic surfaces at low temperatures and which includes in weight percent 5–50% thallium oxide, 10–40% vanadium oxide, 5–30% tellurium oxide, 1.5–15% arsenic oxide and 1–5% phosphorous oxide. Other additives may be included, such as bismuth oxide. A paste formulated from said glass and a filler for the purpose of adjusting the fluidity and/or dielectric constant of the paste.

16 Claims, 4 Drawing Sheets

SEALING GLASS COMPOSITIONS

BACKGROUND OF THE INVENTION

The present invention relates to sealing glass compositions and, more particularly, to sealing glass compositions for bonding ceramic or metal surfaces. Still more particularly the invention relates to compositions useful in bonding ceramics to produce satisfactory bond strength even when fired at temperatures less than 350° C., preferably less than 300° C.

Semiconductor devices or chips, also known as "dies," are packaged in hermetically sealed ceramic containers to resist breakage and destruction. Such ceramic packages may be made of alumina, silicon carbide, silicon nitride, or other ceramics. A common packaging material is alumina ($Al_2O_3$).

Ceramic packages of the type described are typically sealed by applying the sealing glass composition to the surfaces of the ceramic components where sealing is to take place and then heating the assembly to elevated temperatures to effect bonding. A problem in sealing ceramic packages is that conventional sealing compositions typically require firing at temperatures above 400° C. to achieve bonding of the ceramic components with satisfactory bond strength. For example, lead borate-based sealing glass compositions, such as have been commonly used, require firing at 420°–430° C. to produce the desired bond strength. However, many of the new semiconductor devices are much more sensitive to firing temperature than previous devices and their usefulness will be adversely affected by exposure to elevated temperatures. Dies which are sensitive to firing temperature include larger dies and dies employing fine line geometry. In the latter case, lines of $Si-SiO_2-Si$ which are spaced one or two microns apart are provided at the die surface. Firing at high temperatures to accomplish bonding strengths tends to destroy the usefulness of these dies due to incipient melting of the line compositions which may result in undesirable contact between the lines.

Efforts have been made to provide sealing glass compositions which do not require firing at the elevated temperatures such as are necessary with glasses based on lead borate systems. For example, in U.S. Pat. No. 5,013,697, dated May 7, 1991, sealing glass compositions for bonding ceramic surfaces were disclosed which are capable of being fired at temperatures less than 400° C. while still producing satisfactory bond strength. However, there is a continuing interest in sealing glass compositions capable of being used at even lower firing temperatures and the present invention provides sealing glass compositions capable of developing satisfactory bond strength even when fired at temperatures below 350° C., for example, below 300° C.

SUMMARY OF THE INVENTION

In accordance with the present invention there is provided a sealing glass composition suitable for use in bonding ceramic surfaces at low temperatures, e.g., less than 350° C. preferably less than 300° C., comprising, in weight percent, 5–50% thallium oxide, 10–40% vanadium oxide, 5–30% tellurium oxide, 1.5–15% arsenic oxide, 1–5% phosphorous oxide, 0–20% zinc oxide, 0–10% zinc chloride, 0–10% magnesium chloride, 0–10% barium oxide, 0–10% barium chloride, 0–10% strontium oxide, 0–10% strontium chloride, 0–5% bismuth oxide, 0–5% antimony oxide, 0–3% indium oxide, 0–5% silica, 0–5% alumina, 0–15% copper oxide, 0–10% cobalt oxide, 0–15% each of lithium oxide, sodium oxide and potassium oxide, 0–25% lead oxide, and 0–50% of a filler capable of adjusting the coefficient of expansion and dielectric constant of the glass composition to a predetermined extent after firing. A preferred sealing glass composition comprises 25–45% thallium oxide, 20–30% vanadium oxide, 10–20% tellurium oxide, 3–10% arsenic oxide, 1–5% phosphorous oxide and 0.2–1.0% bismuth oxide.

A paste of the sealing glass composition as set forth above may be made by providing a mixture of components within the ranges previously mentioned, heating the mixture to a temperature and for a time sufficient to melt the mixture, quenching the molten mixture to solidify same, comminuting the solidified mixture to produce particles and mixing the particles with an organic vehicle to produce a paste. A preferred paste formulation is made by adding a filler to the mixture of particles and organic vehicle. A preferred sealing glass paste comprises the preferred sealing glass composition described above and 5–40% filler, preferably Mullite.

To use the paste to bond ceramic surfaces for the purpose of sealing a ceramic package containing a semiconductor device, a sealing glass paste of the glass composition previously described, which advantageously also contains an appropriate filler, is provided and applied to the ceramic surfaces where sealing is to take place to produce a package assembly to be sealed, the package assembly is then "fired," i.e., heated, to a temperature less than 350° C., preferably less than 300° C., to volatilize/remove the organic vehicle and to melt the glass and thereby bond the ceramic surfaces and cooling to produce a hermetically sealed ceramic package.

DETAILED DESCRIPTION

Figure 1:
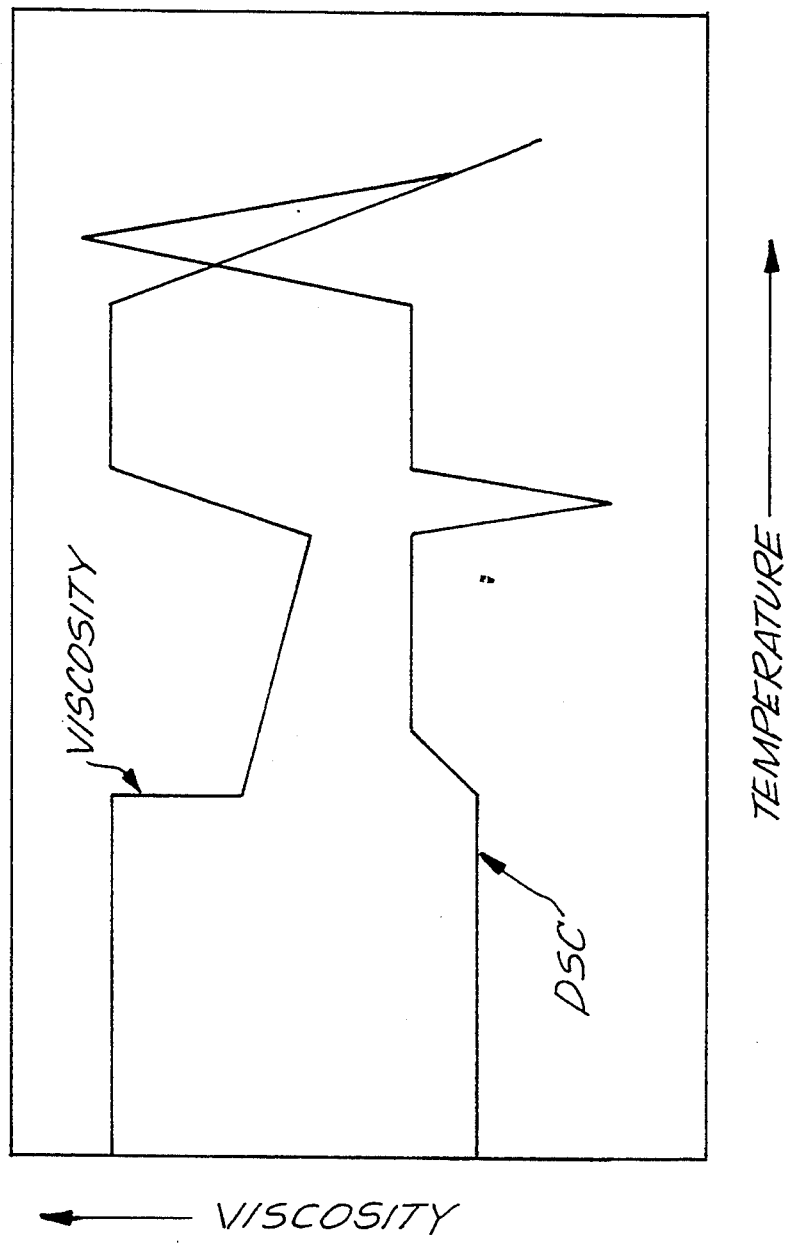
FIG. 1 is a schematic diagram illustrating the change in viscosity at increasing temperature for glass used in conventional sealing glass compositions.

The accompanying schematic drawings usefully illustrate important aspects of the invention. FIG. 1 shows how crystallization changes glass flow characteristics for conventional lead borate glass used in sealing glass compositions. As the glass crystallizes, viscosity increases and there is a sharp drop in viscosity before the temperature reaches the melting point of the glass. (The term "DSC" means differential scanning calorimetric analysis.)

Figure 2:
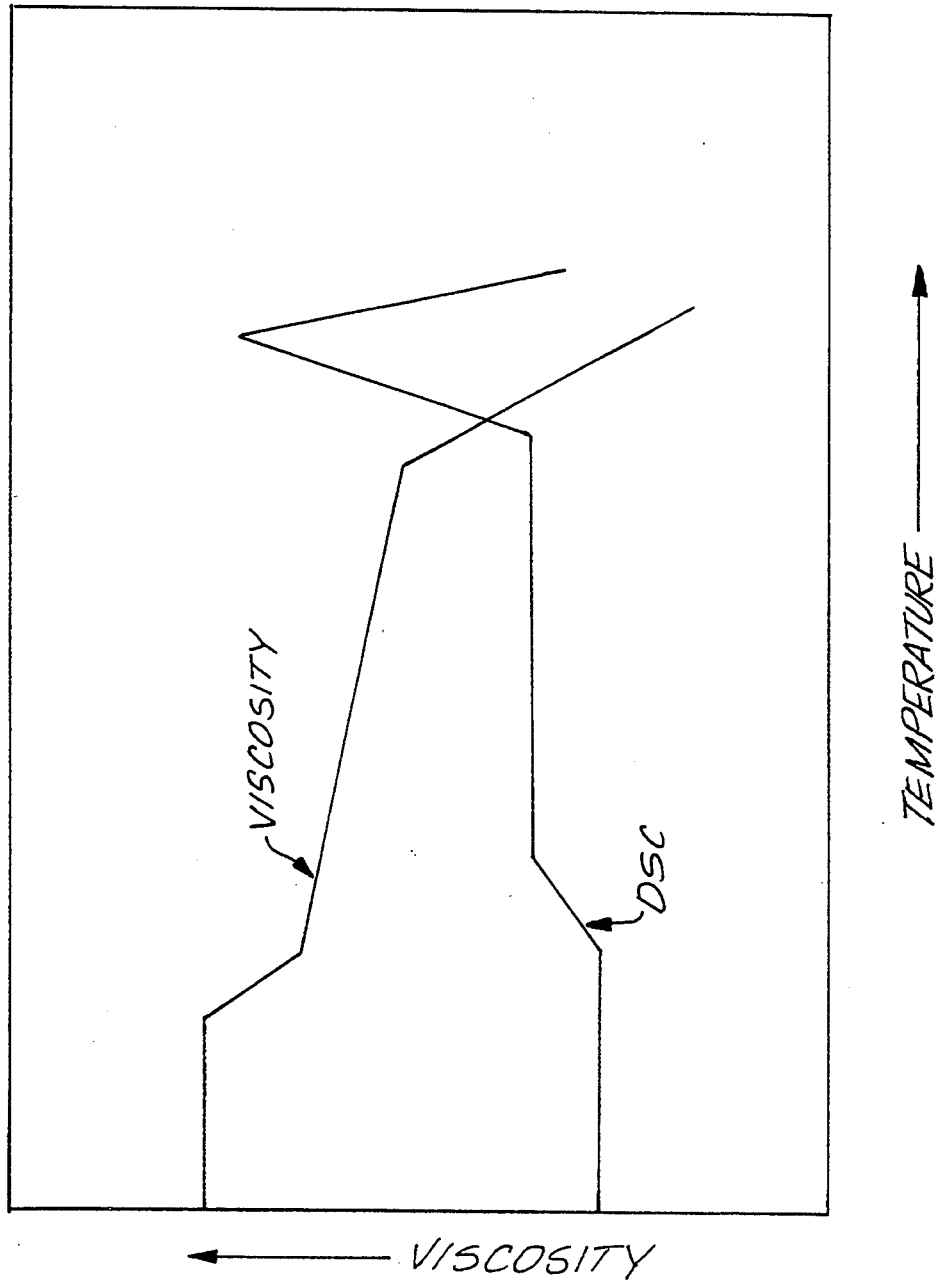
FIG. 2 is a schematic diagram illustrating change in viscosity at increasing temperature for glass in accordance with the invention.

In contrast to conventional glass, sealing glass compositions according to the invention typically behave in the manner shown in FIG. 2. As can be seen, this glass does not experience crystallization up to the melting point.

Sealing glass compositions with controlled amounts of thallium oxide, vanadium oxide, tellurium oxide, arsenic oxide and phosphorous oxide may be formulated to produce a glass with a low transition temperature, $T_g$ of less than 350° C., preferably less than 300° C. The reactivity of the glass composition may be also usefully modified by the addition of 0–5% bismuth oxide. Magnesium oxide in amounts up to 10 wt.% and zinc oxide in amounts of 0–20 wt.% may be added to adjust the fluidity of the glass or to achieve more rapid crystallization. Other additives also may be added to the glass composition to accomplish effects resulting from their addition. These additives include: 0–10% magnesium chloride, 0–10% barium oxide, 0–10% barium chloride, 0–10% strontium oxide, 0–10% strontium chloride, 0–5% antimony oxide, 0–3% indium oxide, 0–5% silica, 0–5% alumina, 0–15% copper oxide, 0–10% cobalt oxide, 0–15% of each of lithium oxide, sodium oxide and potassium oxide, and 0–25% lead oxide. Silver oxide may also be added in amounts of 0–10% however, silver oxide tends to be unstable upon heating and tends to go partially to silver metal, which is undesirable. Nonetheless, a stabilized form of silver oxide which does not tend to go partially to silver metal upon heating may be added.

In addition to the foregoing, it may be desirable to add at least one filler to adjust physical and functional properties of the sealing glass paste after firing. The filler may be, for example, Mullite (aluminum silicate), silicon carbide, silicon nitride or Beta Eucryptite ($Li_2O$-$Al_2O_3$-$2SiO_2$). A filler can be useful in matching the coefficient of thermal expansion of the sealing glass paste with the coefficient of expansion of the alumina packaging material and also to decrease the dielectric constant of the sealing glass-containing mixture. Other physical and functional properties, as later discussed, can also be adjusted by controlling the amount of filler used. The preferred filler, Mullite, is an aluminum silicate, and Beta Eucryptite is made of lithium, aluminum and silicon ions which are smaller in size than those used in the sealing glass composition and would therefore be expected to decrease the dielectric constant of the glass-containing mixture after firing.

To illustrate the invention, the compositions appearing in Table 1 were prepared. These compositions show the effect of lead oxide and thallium oxide on dielectric properties of glass and other components on glass transition temperature and fluidity.

trapped gases from the molten glass. It is important for effective sealing that the glass composition have not more than 25% voids and no cracks after solidification. Although the number of voids can be reduced by allowing the glass to remain molten for a long period of time and/or increasing the temperature, the present glass with arsenic oxide expedites gas removal at lower temperatures. For example, the arsenic-containing glass results in satisfactory gas removal in 10 to 12 minutes, or less, at temperatures of less than 350° C. In contrast, conventional sealing glass compositions are heated to 420°–460° C. to achieve satisfactory gas removal at comparable times. It has been determined that 1.5% to 15% arsenic oxide is useful for this purpose.

The high thallium levels in glass compositions, examples 2 to 10, mainly function to decrease the transition temperature of the sealing glass. Reduction in lead oxide levels from 24.8 wt.% to 11.6 wt.% decreases the crystallization temperature of the glass above its transition temperature. It is observed that as the lead content increases, the dielectric constant of the sealing glass also increases.

Thallium oxide also increases the dielectric constant but to a lesser extent. This effect is believed to be due to the ionic radius of the individual components of the sealing glass. Lead is a divalent ion with an ionic radius of 1.44 angstroms in covalent bonding. Thallium has an ionic radius of 0.95 angstroms in the trivalent state of thallium oxide. Based on ionic radius, it is expected that the dielectric constant of the glass would experience more fluctuations with lead oxide than with thallium oxide. The foregoing effect is illustrated in glass composition 3 which has a fourfold increase of thallium oxide. The dielectric constant of this glass is 18. However, a small addition of lead oxide (3.0 wt.%) as shown in composition 4 increases dielectric constant from 18 to 18.5. Glass composition 10 in Table 1 is lead free and illustrates a preferred embodiment of the invention.

The addition of magnesium oxide allows the glass to crystalize at a much lower temperature than the addition of zinc oxide. However, zinc oxide addition alone increases the glass transition temperature more rapidly

TABLE 1

GLASS COMPOSITION AND EFFECT OF LEAD OXIDE AND THALLIUM OXIDE ON DIELECTRIC PROPERTIES OF GLASS

| Batch Component | Wt. % | | | | | | | | | |
|---|---|---|---|---|---|---|---|---|---|---|
| | 1 | 2 | 3 | 4 | 5 | 6 | 7 | 8 | 9 | 10 |
| $Tl_2O_3$ | 11.6 | 31.1 | 48.2 | 38.5 | 32.5 | 36.7 | 37.5 | 37.0 | 40.3 | 40.3 |
| $V_2O_5$ | 43.5 | 39.3 | 35.5 | 36.8 | 32.9 | 29.3 | 26.7 | 25.0 | 28.8 | 28.8 |
| $TeO_2$ | 20.0 | 18.04 | 16.3 | 16.9 | 15.2 | 16.7 | 15.2 | 14.1 | 16.4 | 16.4 |
| ZnO | — | — | — | 4.8 | 8.5 | 9.2 | 4.3 | 7.7 | 4.6 | 4.6 |
| $ZnCl_2$ | — | — | — | — | 4.6 | 5.6 | 5.1 | 5.8 | — | — |
| $As_2O_3$ | — | — | — | — | 6.3 | 1.6 | 7.2 | 6.7 | 7.7 | 7.7 |
| $PbO_2$ | 24.8 | 11.6 | — | 3.0 | — | — | — | — | — | — |
| MgO | .002 | .002 | .002 | .002 | — | — | — | — | — | — |
| $(NH_4)_2HPO_4[(P_2O_5)]$ | — | — | — | — | — | 0.9 | 4.0 | 3.7 | 2.2 | 2.2 |
| $Bi_2O_3$ | — | — | — | — | — | — | — | — | — | 0.07 |
| Glass Transition Temperature ("Tg") (°C.) | 222 | 191 | 179 | 221 | 216 | 214 | 218 | 224 | 212 | 214 |
| Dielectric Constant | 22 | 20 | 18 | 18.5 | 13.8 | — | — | — | 16 | 20 |

Composition 1 in Table 1 is based on lead-vanadate glass to which thallium oxide is added to reduce the glass transition temperature and arsenic oxide is added to increase the fluidity of the glass above the glass transition temperature. Tellurium oxide is added to provide multivalent, low melting oxide to make the glass more reactive during sealing.

Arsenic oxide is an important component because it increases fluidity, thereby expediting removal of enthan that of zinc chloride which actually decreases the glass transition temperature. Phosphorous oxide changes the softening point and bismuth oxide enhances reactivity, i.e. sealability to both ceramic and metal surfaces.

To show the effect of phosphorous oxide on the fluidity and bond strength of the sealing glass composition while maintaining the other desirable properties exhibited by composition 5 of Table 1, a number of examples were prepared by "doping" with various levels of phosphorous oxide as illustrated in Table 2.

The glass compositions in Table 2 were melted by "batching" the indicated ingredients for 500 gram glass batch size. The batch was transferred from an alumina crucible to a box furnace. The furnace was "ramped" to 500° C. and held there for 15 minutes to remove free chlorine and avoid overflow of the molten glass from the crucible. The temperature was then raised to 750° C. and held for 30 minutes. The resultant molten glass was then fritted in deionized water. Excess water was drained and the fritted glass was transferred to a heat resistant glass tray. The glass was dried at 105° C. for a period of 6.0 hours and particle size reduction was accomplished using an air jet mill to obtain the desired particle size and distribution.

The results show the effect of phosphorous oxide on the softening point of the sealing glass.

TABLE 2

EFFECT OF PHOSPHOROUS PENTOXIDE ON SOFTENING POINT OF SEALING GLASS

| Batch Component | Wt. % | | | | |
|---|---|---|---|---|---|
| | 11 | 11A | 11B | 11C | 12 |
| $Tl_2O_3$ | 34.1 | 33.8 | 33.1 | 33.6 | 33.5 |
| $V_2O_5$ | 27.3 | 27.0 | 26.5 | 26.9 | 26.7 |
| $TeO_2$ | 15.6 | 15.4 | 15.1 | 15.3 | 15.3 |
| ZnO | 8.5 | 8.4 | 8.2 | 8.4 | 8.3 |
| $ZnCl_2$ | 5.2 | 5.1 | 5.0 | 5.1 | 5.1 |
| $AS_2O_3$ | 7.4 | 7.3 | 7.2 | 7.3 | 7.2 |
| $(NH_4)_2HPO_4[(P_2O_5)]$ | 2.0 | 3.0 | 5.0 | 3.5 | 4.0 |
| Softening Point (°C.) | 280 | 284 | 330 | 295 | 310 |

The effect of addition of thallium oxide on the glass properties, in particular Tg, modulus, Poisson ratio, chemical durability and hardness, is illustrated in Table 3 which summarizes the results of a study of glass composition 12 of Table 2 and shows the effect of thallium oxide on the properties of glass.

TABLE 3

EFFECT OF THALLIUM OXIDE ON THE PROPERTIES OF GLASS

| % $TlO_3$ in Glass | $T_2$ | Chemical Durability $(HNO_3)$ $gm/cm^2/hr \times 10^{-7}$ | Young Modulus $(10^6 psi)$ | Poisson Ratio | Hardness $(kgf/MM^2)$ |
|---|---|---|---|---|---|
| 00.0 | 274 | 0.5 | — | — | — |
| 10.0 | 255 | 0.5 | 5.2 | 0.29 | 182.0 |
| 20.0 | 240 | 0.7 | 4.8 | 0.28 | 169.0 |
| 30.0 | 228 | 0.7 | 4.3 | 0.31 | 158.0 |
| 40.0 | 190 | 1.0 | 4.0 | 0.30 | 150.0 |
| 50.0 | 164 | 1.0 | — | — | — |

Chemical durability of the glass was tested by placing a piece of glass in 0.1 (N) of HCl and 0.1 (N) of NaOH at 75° C. for 12 hours. Weight loss was determined after drying the samples. Table 4 below shows the result of additions of 20.0 and 30.0 wt. % thallium oxide to glass composition 12, Table 2.

TABLE 4

EFFECT OF THALLIUM OXIDE ON DURABILITY OF GLASS

| Thallium Content (wt. %) | Acid Durability (HCl) $gm/cm^2/hr \times 10^{-4}$ | Base Durability $gm/cm^2/hr \times 10^{-4}$ |
|---|---|---|
| 20.0 | 17.0 | 5.0 |
| 30.0 | 21.0 | 6.0 |

The durability of glasses in accordance with the invention is close to that of a glass with 80 wt.% lead oxide and 20 wt.% boric oxide which is the base composition of conventional sealing glasses.

As indicated previously, sealing glass compositions are used to seal ceramic surfaces by applying the composition in the form of a paste to the surfaces to be bonded. To illustrate this use, glass paste was formulated as described in Table 5.

TABLE 5

GLASS PASTE FORMULATION

| Component | Boiling Point (°C.) | Wt. % |
|---|---|---|
| Sealing Glass (Glass #12, Table 2) | — | 82.0 |
| Diethylene Glycol Monomethyl Ether | 195 | 9.0 |
| Dimethyl Phthalate | 280 | 9.0 |

The glass of composition 12, Table 2, was prepared, heated to melting temperature and then quenched to solidify the glass. The solidified glass was fritted by comminution and was formulated in a mixture with organic vehicle as described in Table 5 to form a fine glass powder suspension. Preferably, the glass and organic vehicle should be thoroughly mixed. The paste was then dried at 75° C. for one hour and two dried sealing glass layers were placed over each other and fired at 300° C. where they were held for 10 minutes. Studs were attached on both sides of the package and the fracture strength was measured using an "Instron." The results are given in Table 6 along with the sealing conditions employed.

TABLE 6

FRACTURE STRENGTH OF SEALING GLASS FIRED PARTS (AT 300° C.)

| Run # | Average (lb.) | Standard Deviation (lb.) | Sample Size |
|---|---|---|---|
| 1. Au Package[1] | 60.0 | 18.0 | 10 |
| 2. Bare Package[2] | 55.0 | 12.0 | 10 |

Sealing Conditions:
Stencil around 1" × 1" NTK package
Firing temperature - 340° C.
Time at peak - 5 minutes
Furnace - Programmable Blue M
Ramp rate - 10° C./minute
Load - None

[1]gold surface to which seal is made
[2]ceramic surface, without gold, to which seal is made As indicated previously, 0–50% of a filler may be used in the sealing glass formulation to adjust physical and functional properties. Physical properties which can be adjusted by addition of fillers include dielectric constant, resistivity and loss tangent. Functional properties which may be adjusted with fillers include coefficient of thermal expansion ("CTE"), resistance to cracking, adherence to substrates, temperature cycling, and shock resistance.

Ability to adjust CTE to match the CTE of the substrate is especially important and this can be achieved by adjusting the amount of filler in the paste. Typical filler materials useful for this purpose are Mullite, silicon carbide, silicon nitride and Beta Eucryptite ($Li_2O$-$Al_2O_3$-$2SiO_2$). These fillers may be used not only to match the coefficient of thermal expansion of the sealing glass with an alumina package, but also to decrease the dielectric constant of the sealing glass. Beta Eucryptite has a negative thermal expansion coefficient and its addition to the sealing glass composition decrease the overall thermal expansion coefficient of the sealing glass-containing mixture. Because Beta Eucryptite is made of lithium, aluminum and silicon ions which are smaller in size than those used in the sealing glass composition, it decreases the dielectric constant of the sealing glass composite after firing. To illustrate this embodiment, the sealing glass-containing formulations described in Table 7 were prepared.

TABLE 7

| Paste Formulation | Glass # | Glass Wt. % | Filler Name | Filler Wt. % | Terpineol Wt. % | Triton $X^{-100}$ Wt. % | Ethyl Cellulose |
|---|---|---|---|---|---|---|---|
| 1 | 12 | 74.92 | Beta Eucrytite | 8.33 | 15.95 | 0.8 | — |
| 2 | 9 | 66.30 | Mullite | 16.6 | 16.60 | — | 0.5 |
| 3 | 10 | 63.10 | Mullite | 15.7 | 20.70 | — | 0.5 |

The sealing glass pastes of Table 7 were screen printed on a 1"×1" NTK bare alumina substrate and refired at 280° C. The parts were then placed together such that the two screen printed sealing glass faces were sandwiched between two pieces of alumina substrate and then were fired at 340° C. The fracture strength was indicated to be, on average, 23.5 pounds with a standard deviation of 15.97 pounds.

Figure 3:
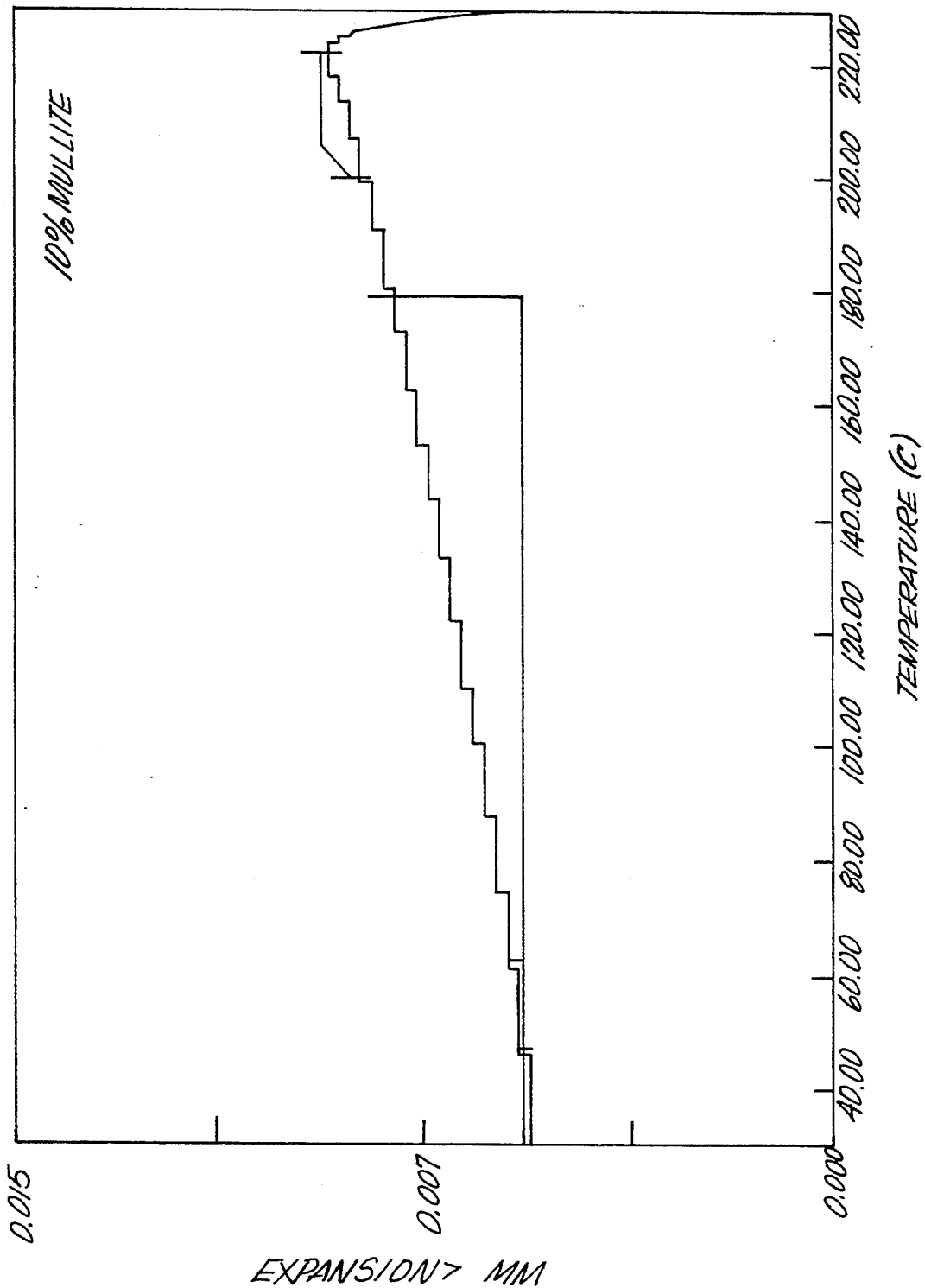
FIGS. 3 and 4 are schematic diagrams illustrating change in expansion in relation to temperature for compositions having different amounts of filler.
Figure 4:
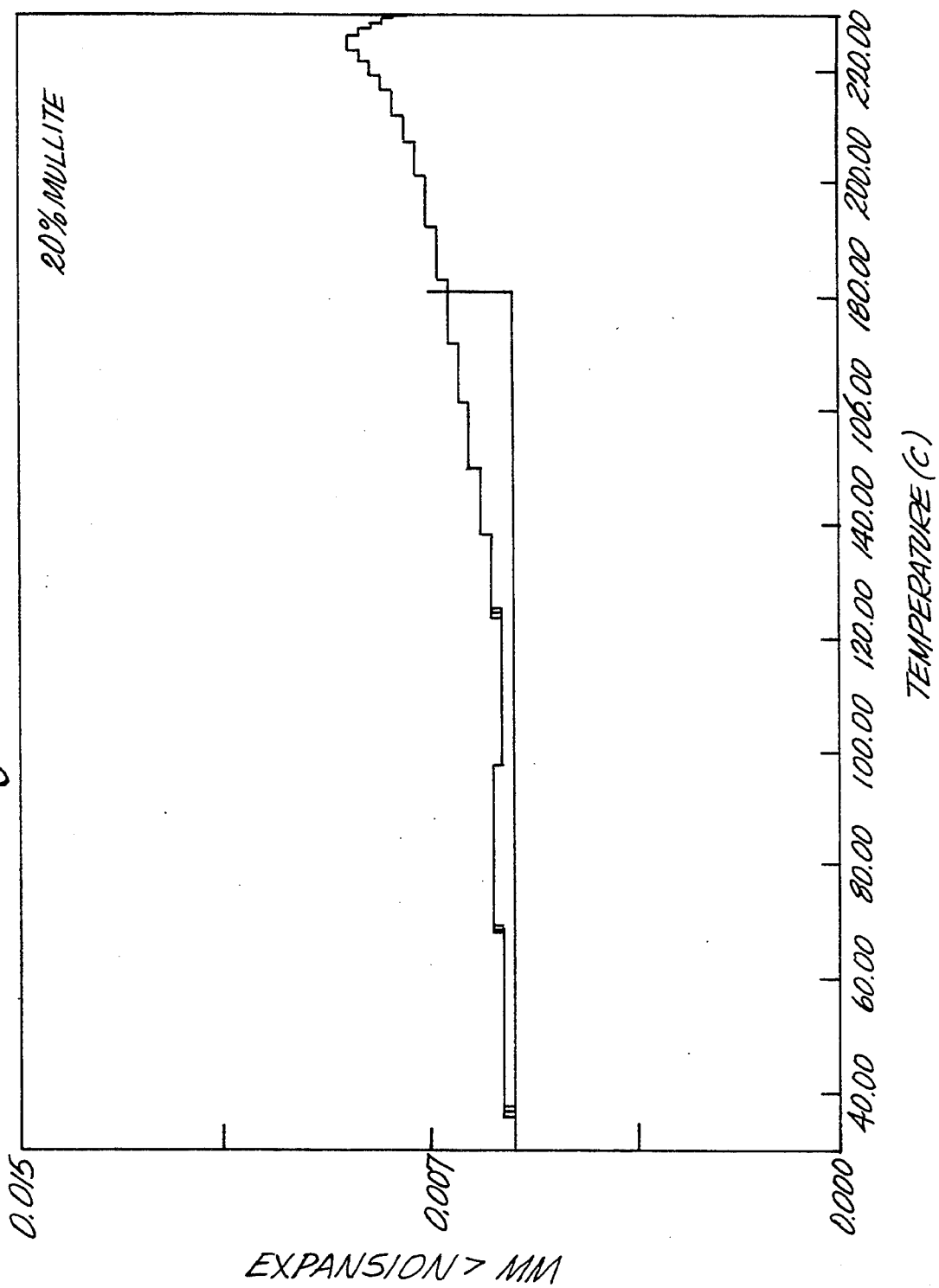

Adjusting properties by controlled addition of filler to the glass-containing mixture is illustrated in FIGS. 3 and 4, which show change in expansion with temperature, for 10% and 20% Mullite, respectively. These graphs indicate how the CTE can be adjusted by controlling the amount of filler.

As indicated previously, the sealing glass composition of the invention may be modified by including any one or a combination of a full complement of additives previously described. For example, oxides of lithium, sodium and potassium may be added to tend to flux the glass, increase its fluidity and lower the glass transition temperature. The addition of a small amount of lead oxide may enhance the glass composition's performance in some respects but it also increases the dielectric constant and the glass transition temperature which is undesirable. However, lead oxide up to 25 wt.% may be added without seriously adversely affecting the desirable properties of the sealing glass composition. Bismuth oxide may be added for its ability to increase wetting on ceramic and gold-surface packages without sacrificing adhesive strength on bare alumina packages. Strontium chloride, in small amounts, increases fluidity. Silicon oxide also increases fluidity but raises the Tg very rapidly. Copper oxide and cobalt oxide function similarly to bismuth oxide to increase sealability to ceramic and metal substrates but addition of cobalt oxide may risk crystallization. Indium oxide may assist wettability to ceramic surfaces. Aluminum oxide increases Young's modulus and may be useful to increase shock resistance. Antimony oxide is useful as a filler in small amounts.

It is apparent from the foregoing that various changes and modifications may be made without departing from the invention. Accordingly, the scope of the invention should be limited only by the appended claims:

What is claimed is:

1. A sealing glass composition suitable for use in bonding to a ceramic surface at low temperatures comprising in weight percent 0.5-50% thallium oxide, 10-40% vanadium oxide, 5-30% tellurium oxide, 1-15% arsenic oxide, 1-5% phosphorous oxide, 0-10% magnesium chloride, 0-10% barium oxide, 0-10% barium chloride, 0-10% strontium oxide, 0-10% strontium chloride, 0-5% antimony oxide, 0-3% indium oxide, 0-5% silica, 0-5% alumina, 0-15% copper oxide, 0-10% cobalt oxide, 0-15% of each of lithium oxide, sodium oxide and potassium oxide, 0-25% lead oxide and 0-10% silver oxide.

2. A sealing glass composition according to claim 1 further comprising 0.2-1% bismuth oxide.

3. A sealing glass composition according to claim 1 comprising about 25-45% thallium oxide, about 20-30% vanadium oxide, about 10-20% tellurium oxide, about 3-10% arsenic oxide, about 1-5% phosphorous oxide and about 0.2-1% bismuth oxide.

4. A sealing glass composition suitable for use in bonding a ceramic surface comprising a mixture of a composition according to claim 1 and up to 50 wt.% of at least one filler from the group consisting of Beta Eucryptite, Mullite, silicon carbide and silicon nitride to adjust one or more physical and functional properties of the mixture.

5. A sealing glass composition according to claim 4 wherein said filler is present in an amount of 5-40 wt.%.

6. A sealing glass composition suitable for use in bonding a ceramic surface comprising a mixture of a composition according to claim 3 and up to 50 wt.% of at least one filler from the group consisting of Beta Eucryptite, Mullite, silicon carbide and silicon nitride to adjust one or more physical and functional properties of the mixture to a extent.

7. A sealing glass composition according to claim 6 wherein said filler is present in an amount of 5-40 wt.%.

8. A method of preparing a paste of the sealing glass composition comprising heating a mixture of components within the ranges recited in claim 1, to a temperature and for a time sufficient to melt the mixture, quenching the molten mixture to solidify same, comminuting the solidified mixture to produce particles and mixing the particles with an organic vehicle to produce a paste.

9. A method according to claim 8 further comprising adding up to 50 wt.% of at least one filler from the group consisting of Mullite, Beta Eucryptite, silicon carbide and silicon nitride to the organic vehicle and glass particles to produce a paste.

10. A method of preparing a paste of a sealing glass composition comprising heating a glass having a composition in the ranges recited in claim 3, glass to a temperature and for a time sufficient to melt quenching the molten mixture to solidify same, comminuting the solidified mixture to produce particles, mixing the glass particles with an organic vehicle to produce a paste and adjusting the fluidity and coefficient of thermal expansion of the composition by adding a controlled amount of filler to the mixture of glass particles and organic vehicle.

11. A method according to claim 10 wherein said filler comprises up to 50 wt.% of at least one from the group consisting of Mullite, Beta Eucryptite, silicon carbide and silicon nitride.

12. A method according to claim 11 wherein said filler is present in an amount of 5 to 40 wt.%.

13. A paste for use in sealing ceramic surfaces together comprising particles of a glass composition as set forth in claim 1 and an organic vehicle in an amount sufficient to form a paste of said glass.

14. A paste for use in sealing ceramic surfaces together comprising a glass composition as set forth in claim 3, up to 50 wt.% of a filler from the group consisting of Mullitc, Beta Eucryptite, silicon carbide and silicon nitride, and an organic vehicle in an amount sufficient to form a paste of said glass.

15. A paste according to claim 14 wherein said filler is present in an amount of 5 to 40 wt.%.

16. A paste according to claim 15 wherein said filler is Mullite.

* * * * *

UNITED STATES PATENT AND TRADEMARK OFFICE
CERTIFICATE OF CORRECTION

PATENT NO. : 5,336,644
DATED : August 9, 1994
INVENTOR(S) : Masyood Akhtar; Kim C. Le; Jess Pedigo; Charles H. Smith It is certified that error appears in the above-indentified patent and that said Letters Patent is hereby corrected as shown below:

In the Drawings:

FIG. 4, Sheet 4, under FIG. 4 between the temperature ranges of "140.00" and "180.00" change "106.00" to -- 160.00 --.

Line 7, after "filler" insert -- is --.

Column 5, line 31, after "HPO$_4$" delete "[(P$_2$O$_5$)]".
Column 5, line 62, in Table 4 change "HCI" to -- HCl --.

Column 7, line 9, after "composition" change "decrease" to -- decreases --.
Column 7, line 19, under "TABLE 7" insert the heading -- SEALING GLASS PASTE FORMULATION --.

UNITED STATES PATENT AND TRADEMARK OFFICE
CERTIFICATE OF CORRECTION

PATENT NO. : 5,336,644
DATED : August 9, 1994
INVENTOR(S) : Masyood Akhtar; Kim C. Le; Jess Pedigo; Charles H. Smith It is certified that error appears in the above-indentified patent and that said Letters Patent is hereby corrected as shown below:

Column 8, line 36, change "Mullitc" to -- Mullite --.
Column 8, line 45, change "Mullitc" to -- Mullite --.
Column 8, line 47, after "mixture" delete "to a extent".
Column 8, line 65, before "glass" insert
  -- heating the --.
Column 8, line 66, before "quenching" insert
  -- the mixture, --.

Column 10, line 6, change "Mullitc" to -- Mullite --.

Signed and Sealed this

Seventh Day of March, 1995

Attest:

BRUCE LEHMAN

Attesting Officer　　　Commissioner of Patents and Trademarks